United States Patent
Allen

(10) Patent No.: US 9,097,351 B2
(45) Date of Patent: Aug. 4, 2015

(54) FLOW CONTROL HEMISPHERICAL WEDGE VALVE

(75) Inventor: Stanley C. Allen, Conroe, TX (US)

(73) Assignee: Proserv Operations Inc., Houston, TX (US)

( * ) Notice: Subject to any disclaimer, the term of this patent is extended or adjusted under 35 U.S.C. 154(b) by 866 days.

(21) Appl. No.: 12/889,622

(22) Filed: Sep. 24, 2010

(65) Prior Publication Data

US 2011/0073793 A1 Mar. 31, 2011

Related U.S. Application Data

(60) Provisional application No. 61/245,925, filed on Sep. 25, 2009.

(51) Int. Cl.
F16K 5/06 (2006.01)

(52) U.S. Cl.
CPC .................................. *F16K 5/0605* (2013.01)

(58) Field of Classification Search
USPC ........ 251/118, 123, 125, 127, 315.01, 315.16
See application file for complete search history.

(56) References Cited

U.S. PATENT DOCUMENTS

| 3,191,906 | A | * | 6/1965 | Zeigler et al. | 251/208 |
| 3,700,003 | A | * | 10/1972 | Smith | 137/614.17 |
| 4,962,911 | A | | 10/1990 | Soderberg | |
| 4,989,833 | A | * | 2/1991 | Polon | 251/209 |
| 5,333,834 | A | | 8/1994 | Soderberg | |
| 5,551,467 | A | * | 9/1996 | Booth et al. | 137/1 |
| 5,593,135 | A | * | 1/1997 | Lester et al. | 251/209 |
| 6,981,691 | B2 | * | 1/2006 | Caprera | 251/298 |
| 7,484,523 | B2 | | 2/2009 | Church | |
| 2005/0166964 | A1 | | 8/2005 | Hall | |

FOREIGN PATENT DOCUMENTS

| DE | 3729255 | 11/1988 |
| DE | 19940471 | 8/2005 |
| GB | 1208808 | 10/1970 |

OTHER PUBLICATIONS

Ball-Trol Rotary Control Valve. Daniel Valve, Jun. 1998. p. 1-4.

* cited by examiner

*Primary Examiner* — John K Fristoe, Jr.
(74) *Attorney, Agent, or Firm* — Cooke Law Firm

(57) ABSTRACT

A hemi-wedge control valve is disclosed that includes an opening in the hemi-wedge valve member. The opening is provided with a notch in its leading edge to allow for controlled flow as the valve is initially opened.

5 Claims, 3 Drawing Sheets

FLOW CONTROL HEMISPHERICAL WEDGE VALVE

This application claims priority to provisional application Ser. No. 61/245,925 filed on Sep. 25, 2009.

BACKGROUND OF INVENTION

1. Field of the invention

The present invention generally relates to an improved valve of the hemi-wedge type for use in the control of fluids in a pipeline. The valve of the present invention is particularly useful in providing both a tight shutoff of fluids when closed, a high flow when open, and a means of providing variable or graduated flow control as the valve is initially opened.

2. Description of Related Art

Ball valves, plug valves, and the like are well known to those skilled in the art. A common characteristic of these valves is that they may be moved from a full open position to a full closed position through an angle of no more than about ninety (90) degrees.

A simple ball valve comprises a rotatable ball having a bore therethrough corresponding to the fluid flow path, together with a seat for sealing with the ball surface. Ball valves permit fluid flow to be fully stopped by rotating the ball not more than about ninety (90) degrees. However, these valves offer only minimal graduated control of the fluid flow achieved by setting the ball at intermediate positions. Further, these valves are placed in the open or close position without a mechanical force applied by the closure member against a seat.

A simple plug valve comprises a rotatable tapered plug having a bore therethrough disposed in a complementary housing. The plug permits flow to be fully stopped by rotating the plug more than about ninety (90) degrees. Plug valves operate similarly to the previously described ball valve and offer similar advantages and disadvantages.

Gate valves, globe valves and the like are also well known to those skilled in the art. A common characteristic of the valves is that they may be moved from a full open position to a full closed position by the rising and lowering of a valve stem acting on a closure member (gate in a gate valve or disc or plug in a globe valve). These valves offer sealing advantages over ball valves, but take longer to open or close and generally have a higher leakage of fluid to the atmosphere with the rising and lowering of the stem.

A valve offering significant advantages over conventional ball, plug, gate, and globe valves is the hemi-wedge valve described in U.S. Pat. No. 4,962,911, and improved with a valve driver in U.S. Pat. No. 5,333,834, and improved with a cartridge feature for quick and easy repair in U.S. Pat. No. 7,484,523. The contents of these three patents are expressly incorporated herein by reference thereto. The hemi-wedge valve includes a curved wedge comprising a tapered, spherical section rotatable through the fluid path and cooperating with a complementary curved seat to affect a shutoff. An important feature of the hemi-wedge valve is that the thickness of the wedge increases from its leading end to its trailing end. The wedge includes a round bore forming a part of the fluid path through its thinner, leading end. The wedge is solid and thicker at its trailing end. Rotation of the hemi-wedge through about ninety (90) degrees into the fluid path closes the fluid path by blocking it with the solid and thicker end of the wedge. This provides a mechanical loading of the seat. Another important feature of the improved hemi-wedge valve is a replaceable cartridge which may be quickly and easily removed and replaced in a valve body without removing the valve from the pipeline.

BRIEF SUMMARY OF THE INVENTION

The present invention is an improvement in the design of a hemi-wedge type valve. In particular the leading portion of the circular opening in the wedge valve member is provided with a notch to permit a graduated control of fluid flow as the valve begins to open but then allows full open flow after the valve member is fully rotated. Previous art describes rotation of the hemi-wedge through about ninety (90) degrees into the fluid path which closes the fluid path by blocking it with the solid and thicker end of the wedge. This angle can be varied, either increased or decreased, for the purpose of providing graduation of flow as desired for the application within the pipeline. The combinations of the verifiable shutoff feature and the various shapes of entry allow the valve to provide a mechanical tight shutoff seal, the ability to verify shutoff in either or both direction, and to have a graduation of flow when the valve is open-all accomplished with one valve. Existing technology requires a minimum of two, three or more valves to accomplish this function.

BRIEF DESCRIPTION OF THE SEVERAL VIEWS OF THE DRAWING(S)

DETAILED DESCRIPTION OF THE INVENTION

Figure 1:
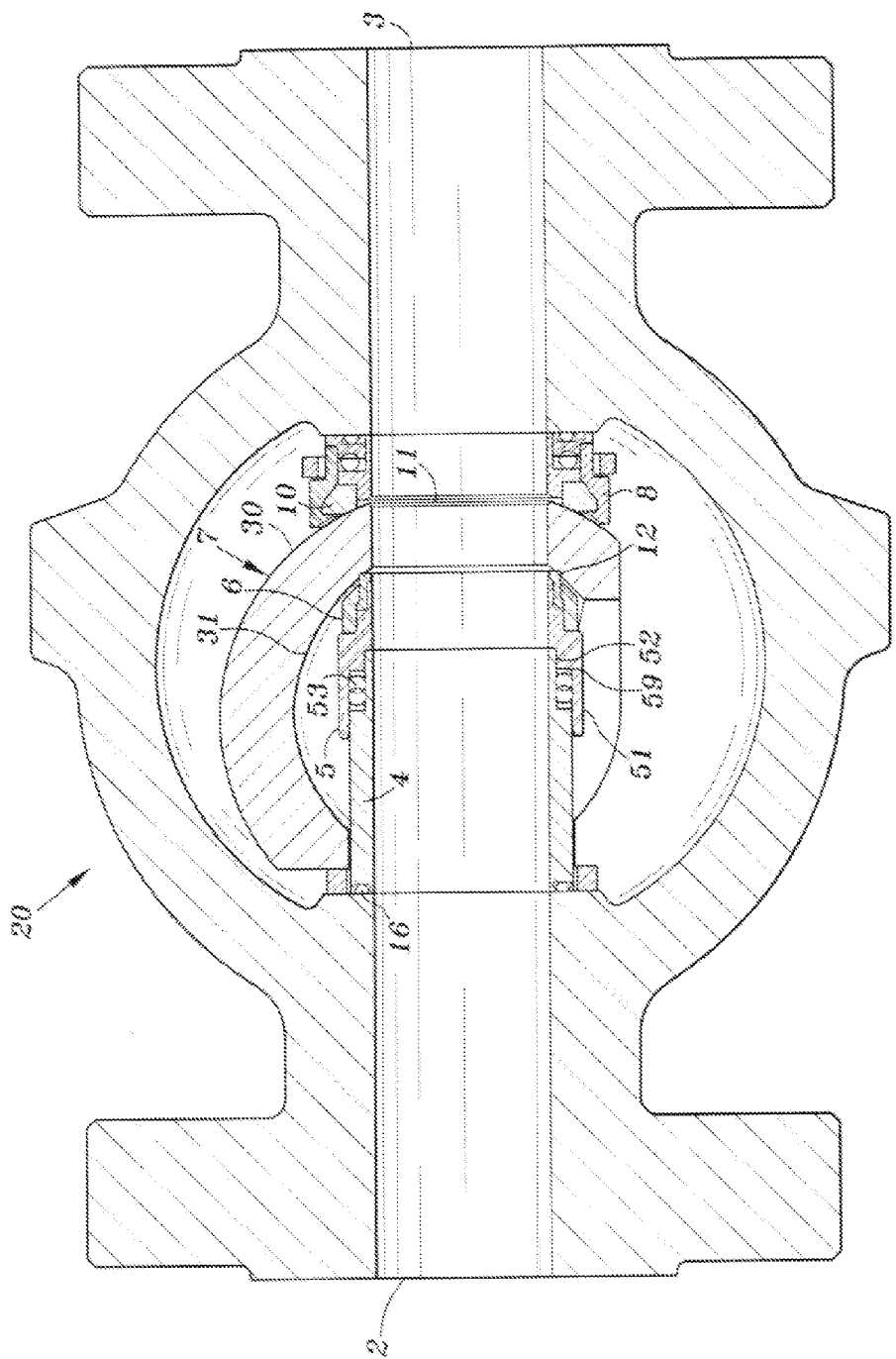
FIG. 1 is a sectional view of a hemi-wedge type valve.

Referring to FIG. 1, a hemi wedge valve 20 is shown including an inlet 2, a core section comprising two cylindrical hollow body members 4, 5, and an outlet 3. A hemi-wedge valve element 7 is rotatably mounted in the valve 20. The thickness of the hemi-wedge valve element increases from the leading edge to the trailing edge which results in an improved seal. The operation of the wedge is described in detail in U.S. Pat. No. 4,962,911, the contents of which is expressly incorporated herein. The hemi-wedge valve member 7 has an opening 11 which when in the open position aligns with core members 4, 5, and outlet 3 as shown in FIG. 1. The valve also includes seals 53, 16, 12, and 10. Core member 5 includes a first cylindrical portion 51, a first shoulder 59 and a second cylindrical portion 52 that receive complimentary shaped portions on the core member 4. Hemi-wedge valve element 7 includes inner and outer curved surfaces 31 and 30. A downstream valve seat 8 holds seal 10. The particular arrangement of the hemi-wedge valve shown in FIG. 1 results in a dual valve seat arrangement that includes inner and outer surfaces 31 and 30 and seals 12 and 10 respectively.

Figure 2:
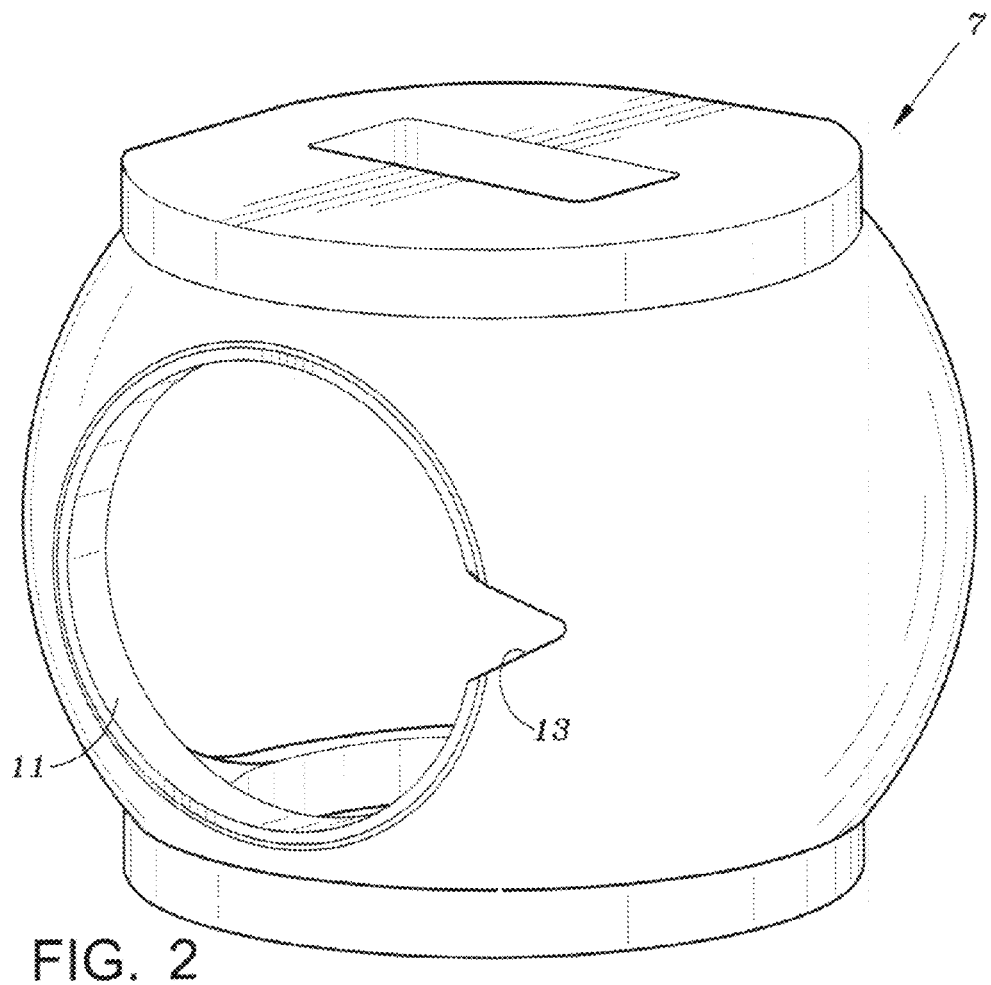
FIG. 2 is a perspective view of the hemi-wedge valve member.
Figure 3:
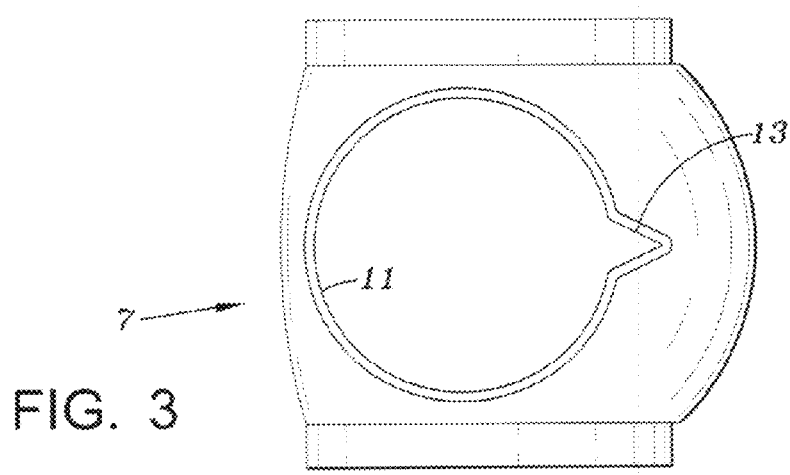
FIG. 3 is a front view of the hemi-wedge valve member.
Figure 4A:
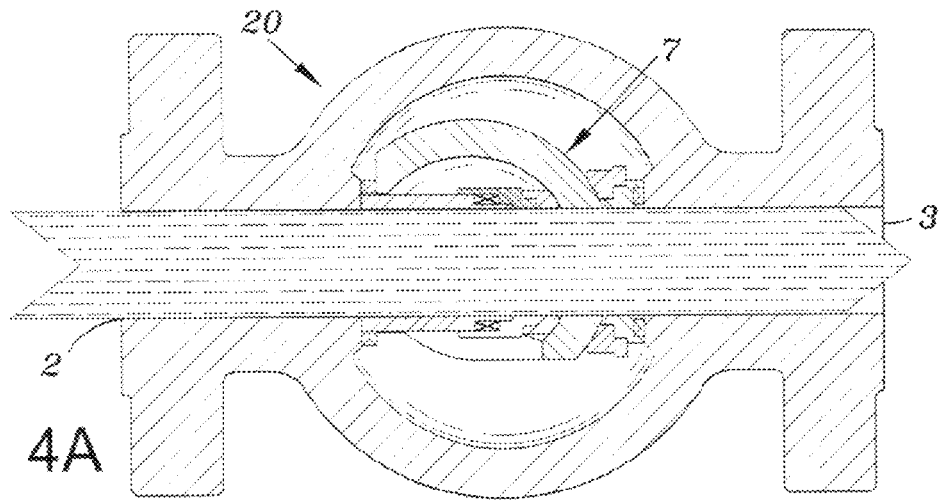
FIG. 4 is a cross-sectional view of the hemi-wedge valve showing the flow through the valve at 100% open, 75% open and 25% open.
Figure 4B:
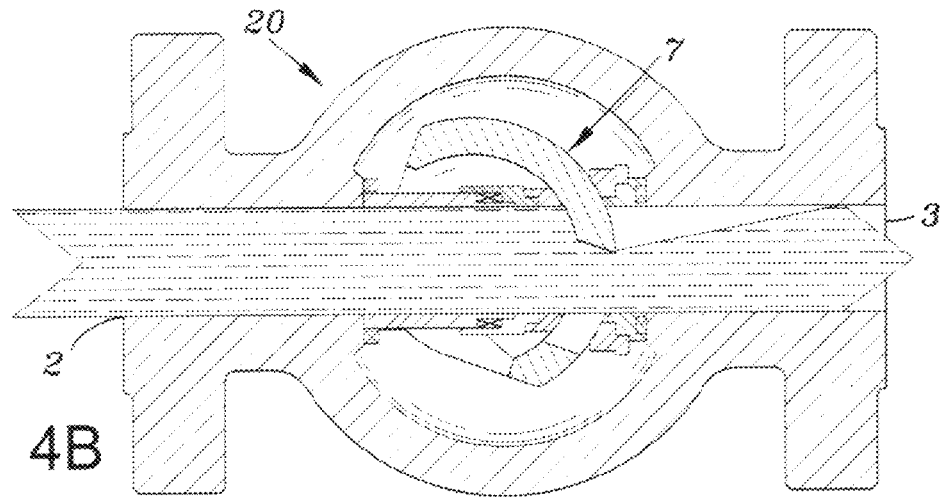
Figure 4C:
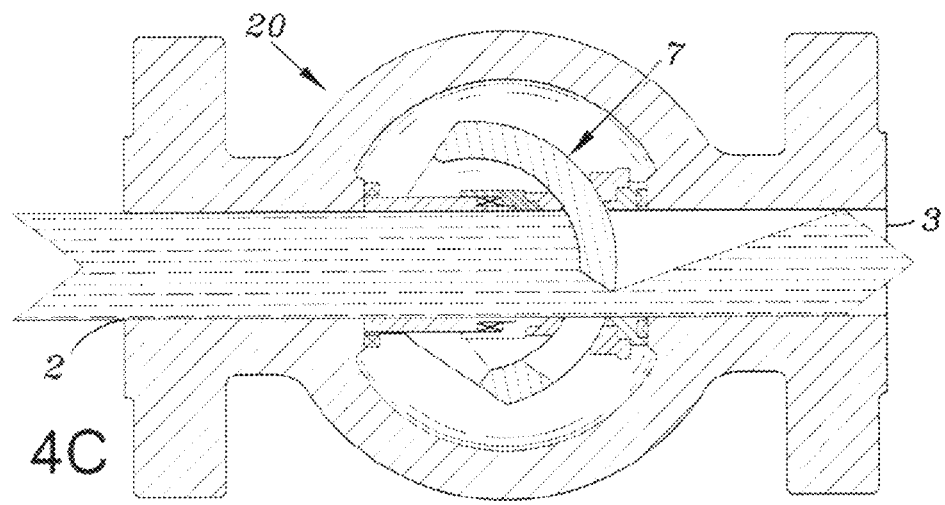

In accordance with the invention, the leading portion of the opening 11 is provided with a notch 13 to allow for initial flow control as the valve is opened. As shown in FIGS. 2 and 3, the notch 13 extends entirely through the wall portion of hemi-wedge valve element 7. While a V-shaped notch is shown in FIGS. 2 and 3, it is understood that various shapes of the notch are possible to provide the initial flow control. Furthermore, a particular hemi-wedge has been illustrated for purposes of describing the invention; however the invention may be used with any known hemi-wedge valve of the type that includes a rotatable hemi-wedge valve element. The flow control is further described with FIG. 4 by illustrating the flow through the valve with the hemi-wedge element placed in the 100% open, 75% open and 25% open positions.

In operation, as the valve is initially opened, only a controlled relatively small amount of fluid is allowed to flow through notch 13. As the valve is furthered opened, a controlled amount of flow passes through the hemi-wedge element 7 until the valve is in the fully opened position shown in FIGS. 1 and 4.

Although the present invention has been described with respect to specific details, it is intended that such details should be regarded as limitations on the scope of the invention, except to the extent that they are included in the accompanying claims.

I claim:

1. A valve comprising:
   a housing;
   a fluid inlet and fluid outlet in the housing;
   a valve seat within the housing;
   a hemi-wedge valve member mounted within the housing;
   the hemi-wedge valve member having an opening that cooperates with the valve seat to control fluid through the valve; and
   the opening being provided with a notch at the circumference of its leading edge.

2. A valve according to claim 1 wherein the notch is in the shape of a V.

3. A valve according to claim 1 wherein the notch extends entirely through the wall portion of the hemi-wedge valve member.

4. A valve according to claim 1 wherein the hemi-wedge valve member includes a wedge portion the thickness of which increases from its leading edge to its trailing edge to provide a mechanical loading of the seat as the valve is moved to a closed position.

5. A valve according to claim 1 further including a flow path of substantially uniform diameter extending from the fluid inlet to the fluid outlet and wherein the diameter of the opening in the hemi-wedge valve member is substantially the same as the diameter of the flow path.

* * * * *